United States Patent [19]

Chahabadi et al.

[11] Patent Number: 4,799,138
[45] Date of Patent: Jan. 17, 1989

[54] CIRCUIT FOR PRODUCING AN ALTERNATING VOLTAGE

[75] Inventors: Ziaedin Chahabadi, Bad Münder; Martin Brahms; Olaf Wittur, both of Hanover, all of Fed. Rep. of Germany

[73] Assignee: kabelmetal electro Gesellschaft mit beschränkter Haftung, Hanover, Fed. Rep. of Germany

[21] Appl. No.: 98,390

[22] Filed: Sep. 17, 1987

[30] Foreign Application Priority Data

Sep. 26, 1986 [DE] Fed. Rep. of Germany ....... 3632746

[51] Int. Cl.⁴ ............................................ H02M 3/335
[52] U.S. Cl. ...................................... 363/21; 363/97; 363/131
[58] Field of Search ....................... 363/20, 21, 89, 97, 363/131; 323/222

[56] References Cited

U.S. PATENT DOCUMENTS 4,024,437 5/1977 Suzuki ............................... 363/21 X
4,504,898 3/1985 Pilukaitis et al. ................. 363/21 X
4,609,982 9/1986 Gohda .................................... 363/89

OTHER PUBLICATIONS

Johari, IBM Technical Disclosure, "Single Stage TSR with Regulation in Main Switching Transistor and Output Filter Circuits", Nov. 1976, pp. 2130-2131.

Primary Examiner—Peter S. Wong
Assistant Examiner—Kristine Peckman
Attorney, Agent, or Firm—Martin A. Farber

[57] ABSTRACT

A circuit is described for producing an alternating voltage in an electronic device which is remotely fed over a digital transmission path. By the pulses of a clock (8) two capacitors, C1, C2 are charged via a transistor (T1) and a transformer (10), one of them (C2) being discharged over a parallel resistor (R2). A coupling capacitor (CK) which is charged by the other capacitor (C1) is discharged alternately by the influence of the dischargeable capacitor (C2) over a transistor (T2).

9 Claims, 3 Drawing Sheets

CIRCUIT FOR PRODUCING AN ALTERNATING VOLTAGE

FIELD AND BACKGROUND OF THE INVENTION

The present invention relates to a circuit for producing an alternating voltage in an electronic device which is connected to a d.c. voltage via the remote feed.

Such a circuit can be used for example to produce the ringing voltage in the "PCM 2" method used by the German Federal Post Office in which two spatially adjacent subscribers of the public telephone network are connected to the central office by one connection line. The further explanations will apply—as representative for another possible use of the invention—to this system. The letters "PCM" stand for the well-known "pulse code modulation method" by which communication signals are transmitted as digital signals.

In the PCM 2 method, the analog signals are digitalized in the central office and sent out on the subscriber's line. At the end of the subscriber's line there is installed a device by which the incoming digital signals are converted back into analog signals. This applies of course also to the opposite direction. The two subscribers are connected to the device by connecting lines.

Because of the digital transmission of the signals, the two subscribers can telephone at the same time without interferring with each other. The two streams of signals are in this connection "interleaved" by known technique at the start of the suscriber's line and separated again at the end thereof. Since the ringing voltage cannot be transmitted over the subscriber's line due to the digital transmission of the signal, it must be produced in the device.

SUMMARY OF THE INVENTION

It is an object of the invention to provide a circuit with which an alternating voltage can be produced in a simple and compact manner at the end of a digital transmission path for communication engineering signals.

Accordingly the invention provides:

that within the device (1) there is arranged a current supply part (2) which produces a voltage for the operating of the electronic system (3) of the device (1) and for supplying the current for at least one external load (7);

that within the device (1) there is furthermore present a clock (8) whose pulses are fed via a control element (9) to the control electrode of a transistor (T1) within the current path of which the primary winding of a transformer (10) is located;

that in each of two different current paths, a diode (D1, D2) with capacitor (C1, C2) connected behind it is connected to the secondary winding of the transformer (10);

that the consuming load which lies in series with a coupling capacitor (CK) can be connected in parallel to the first capacitor (C1) and to the current path of a discharge transistor (T2) to the control electrode of which there is connected the second capacitor (C2) to which an ohmic resistor (R2) is connected in parallel;

that in parallel to the first capacitor (C1) there is furthermore connected a voltage divider (R3, R4) which receives as actual value the instantaneous value of the voltage on said capacitor (C1) and to the junction point (P) of which there is connected a first input of a comparator (11) to which an alternating voltage is fed as desired value over a second input; and that the output of the comparator (11) is connected to the control member (9).

This circuit, which is of simple construction, requires only a few individual parts. It can therefore be contained within a very small space, so that the dimensions of the device within which the circuit is provided can be kept small. The circuit operates with high efficiency since practically only alternating-current portions are converted into effective power. The energy to be dissipated in each case upon the discharge process can advantageously be fed back to the power supply of the device.

Further, according to a feature of the invention, the current which has dropped over the discharge transistor (T2) is fed back to the current supply of the device (1).

Also the transistor (T1) can be developed as a field effect transistor, preferably a MOSFET.

Still further, the transistor (T1) can be developed as bipolar transistor.

Moreover, according to the invention the discharge transistor (T2) can be developed as field effect transistor, preferably as MOSFET.

Yet further, instead of the discharge transistor (T2), a Darlington circuit is used.

Also the invention provides that the current supply part (2) can be developed as switch network part.

BRIEF DESCRIPTION OF THE DRAWING

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
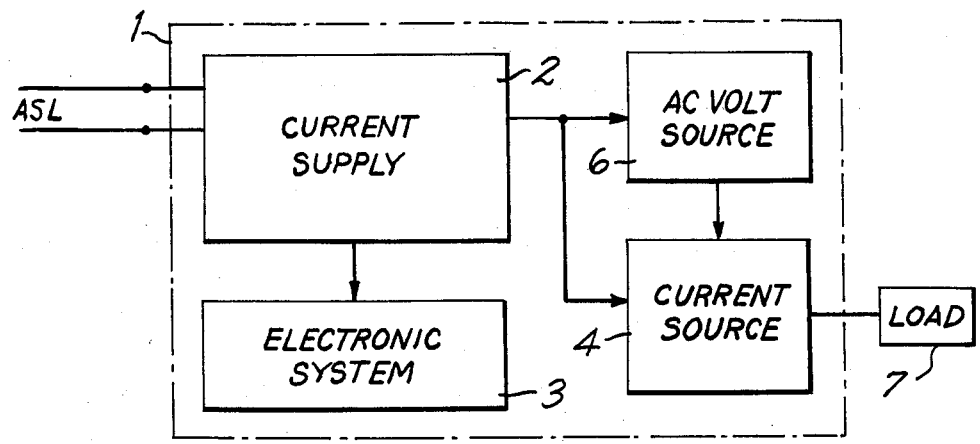
FIG. 1 is a block diagram showing the parts of a remotely fed device with a circuit in accordance with the invention.
Figure 2:
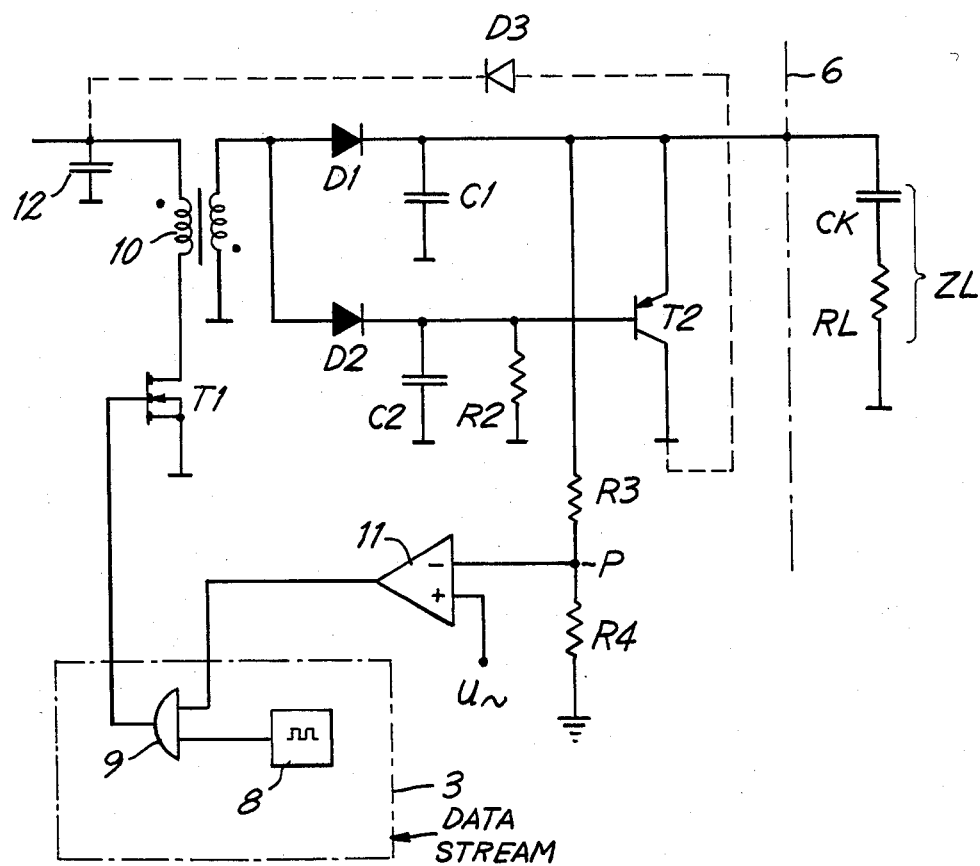
FIG. 2 is the circuit itself.

At the end of a transmission path formed, for instance, by a telecommunication subscriber's line ASL there is connected a device 1 indicated by a dash-dot line. The device 1 is remotely fed, with a voltage of, for instance, 93 V via the subscriber's line ASL. To the remote feed there is connected a current supply part 2 which, for instance, can be a switch network part. The current supply part 2 can apply lower voltage of, for instance, $\pm 5$ V to which the electonic system 3 of the device 1 is connected, and a higher voltage of, for instance, 20 V, to which a source of current 4 and a circuit 6 for producing an alternating voltage are connected. In principle, it is also sufficient for the current supply part 2 to supply only one voltage to which all components of the device are connected. To the source of current 4 there is connected an external load 7. The circuit 6 is shown in greater detail in FIG. 2.

The circuit will be explained on the example of the PCM 2 system, the expression "ringing voltage" being used instead of "alternating voltage". The load 7 is the ringer of a telephone, which is formed of a coupling capacitor CK and a resistor (load) RL, they together forming the ringer impedance ZL.

The ringing voltage of, for instance, 25 to 30 volts effective with 25 or 50 Hz is produced in the case of a call arriving at the office for a subscriber at which the telephone connected to the device 1 is installed, by a signal sent out by the office, which signal may be a bit of the data stream transmitted from the office to the subscriber. The data stream is received in the device 1 and processed therein in the electronic system 3. The electronics system 3 has a clock 8 from which pulses of, for instance, 64 KHZ are derived.

The pulses are fed via a control element 9 which is also present in the electronics system 3 and does or does not pass the pulses, to the control electrode of a transistor T1 whose current path the primary winding of a transformer 10 lies. The control element 9 can, for instance, be an AND gate. As transistor T1, a field effect transistor and in particular a MOSFET is preferably used. However a bipolar transistor (T1' in FIG. 3) can also be used. The transistor T1 is activated by pulses of the control element 9 to assume alternately states of conduction and nonconduction to current in the primary winding. The voltage thereby induced by the transformer 10 is rectified on the secondary side via two diodes D1 and D2 lying in different current paths and each used for charging a subsequent capacitor C1 and C2.

The first capacitor C1 is connected via the coupling capacitor CK directly to the load to be driven (resistor RL), while the other capacitor C2 is connected to the control electrode of a discharge transistor T2 the current path of which is connected in parallel to the coupling capacitor CK and to the first capacitor C1. In parallel to the second capacitor C2 there is a resistor R2 whose resistance is large as compared with the amount of the impedance ZL. The resistance of R2 is determined by the current amplification factor of the discharge transistor T2.

Figure 3:
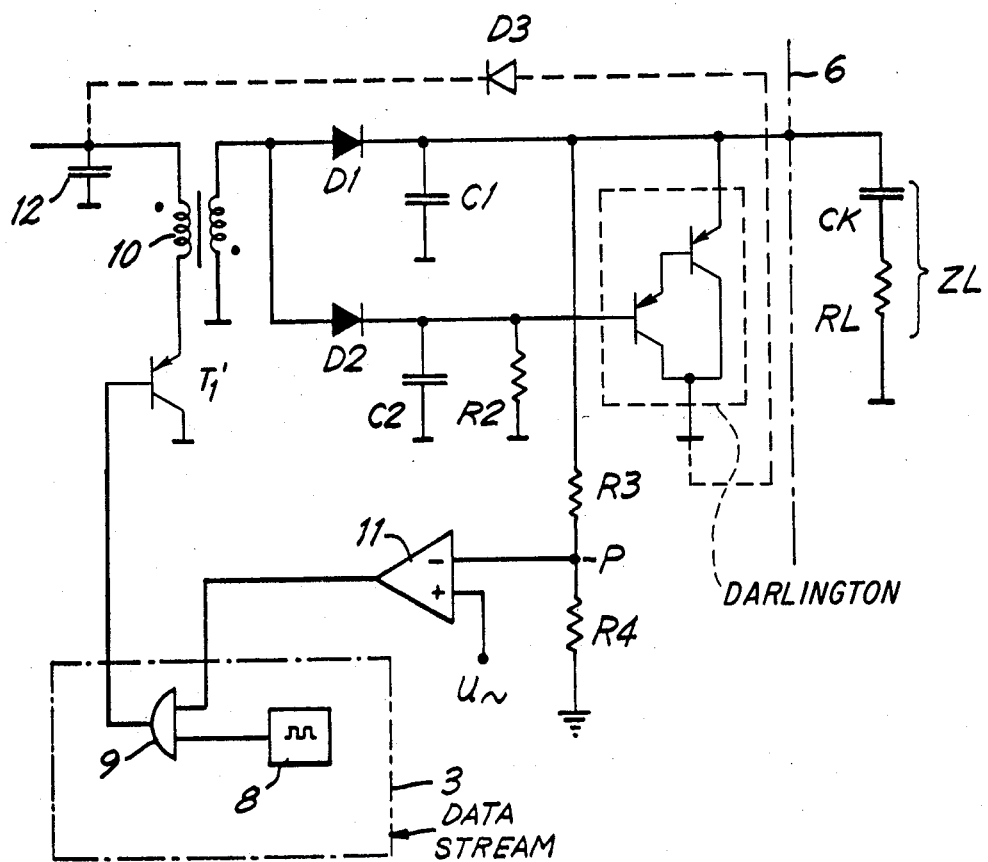
FIGS. 3 and 4 show alternate embodiments of the circuit.
Figure 4:
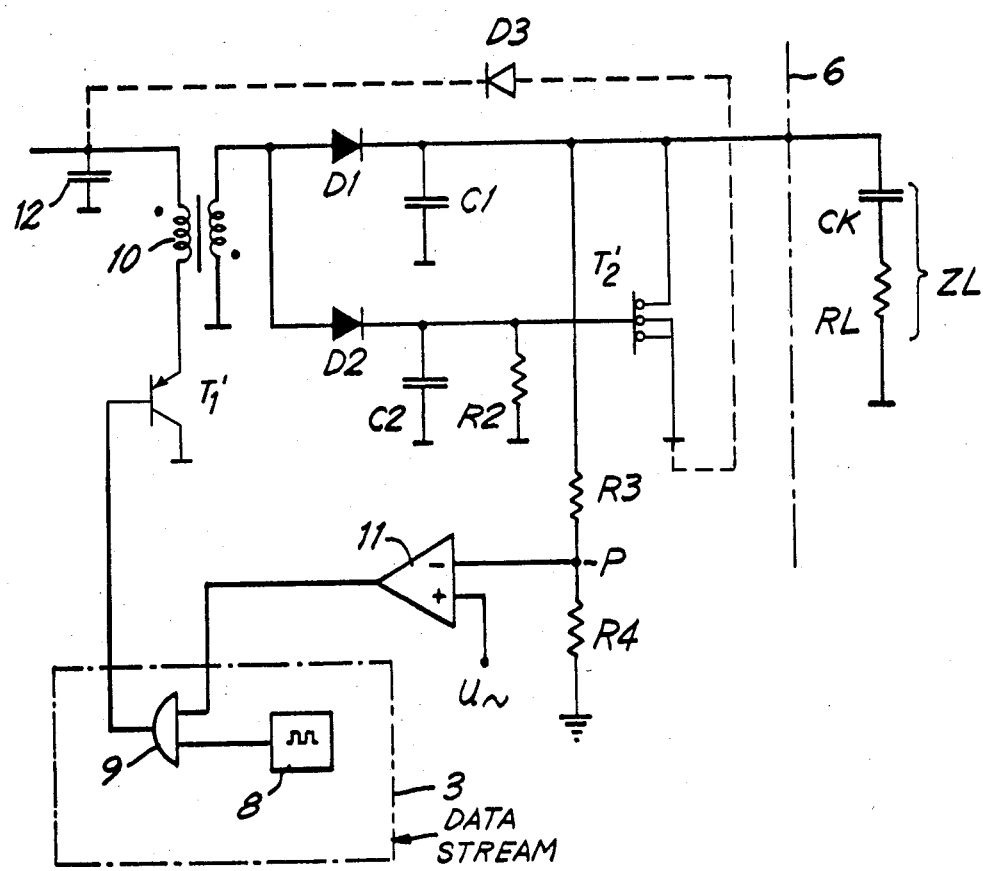

The discharge transistor T2 is shown as a bipolar transistor. It can be replaced by a Darlington circuit (FIG. 3). However a field effect transistor (T2' in FIG. 4) can also be used here, in particular a MOSFET.

The circuit of the invention operates as follows:

After receipt of a signal sent out by the office and arriving over the subscriber ASL, the clock 8 starts to transmit pulses. These pulses pass the control element 9 since there is no voltage at the capacitor C1. The comparator 11 then has for instance a logical "1" at its output. This takes place as long as the voltage on the capacitor C1 is less than the alternating voltage fed to the comparator 11 via its second input. This alternating voltage comes from a separate voltage source. It is a desired value (set point) with reference to the comparator 11, the voltage on the capacitor C1 being the actual value (control point). The transistor T1 is switched alternately between states of conduction and nonconduction in response to pulses of the clock 8. The voltage thereby induced by the transformer 10 after rectification by the diodes D1 and D2 charges the two capacitors C1 and C2. The voltage present at the capacitor C1 is continuously taken up by the voltage divider R3/R4 and fed to the comparator 11 as actual value (Point P). If the voltage on the capacitor C1 exceeds the desired value, a logical "0" appears at the output of the comparator 11. The control element 9 is thereby blocked so that the pulses of the clock 8 no longer arrive at the transistor T1. The charging process for the capacitors C1 and C2 is thus interrupted.

The coupling capacitor CK lying in parallel to the capacitor C1 is charged simultaneously. When the charging process is interrupted, the capacitor C2 will discharge rapidly via resistor R2. The voltage at the control electrode of the transistor T2 rapidly drops so that the latter is brought into current passing condition and thereby discharges the coupling capacitor CK as well as the capacitor C1. The voltage on the voltage divider R3/R4 then drops to such an extent that a logical "1" is again present on the output of the comparator 11. The pulses of the clock 8 pass again to the transistor T1 and the capacitors C1, C2, and CK are charged again. This process takes place in continuous alternation until the clock 8 is turned off.

The energy of the coupling capacitor CK which is to be dissipated via the discharge transistor T2 can be fed via a diode D3 to the voltage supply (higher voltage of the current supply part 2) as far as every instantaneous value of the voltage present on the resistor RL is greater than the operating voltage. The capacitor C2 is an element of the current supply part 2.

We claim:

1. A circuit for producing an alternating voltage in an electronic device which is connected to a d.c. voltage via a remote feed, said circuit being located within the device and comprising:

an electronic system, and a current supply which produces a voltage for operating the electronic system and for supplying a current for at least one load external to the device;

a clock producing pulses, a transformer having a primary winding and a secondary winding, a first transistor having a control electrode and being located within a current path of the primary winding, and a control element connected to the control electrode of the transistor, the pulses of the clock being fed via the control element to the control electrode of the first transistor, current of said secondary winding being divided among a first current path and a second current path;

a first diode and a first capacitor disposed in said first current path of said secondary winding, and a second diode and a second capacitor disposed in said second current path of said secondary winding, an output terminal of said secondary winding being connected via said first and said second diodes respectively to said first and said second capacitors;

a second transistor having a control electrode connected to said second capacitor, a first resistor connected in parallel to said second capacitor, and wherein the load includes capacitive and resistive elements serially connected between terminals of the load, the load being connected in parallel with said first capacitor and being connectd via a current path to said second transistor for discharge of said capacitive element;

a comparator having a first input terminal and a second input terminal, a second resistor and a third resistor serially connected via a junction point to form a voltage divider; and wherein said voltage divider is connected in parallel to the first capacitor the junction point of the voltage divider being connected to the first input terminal of the comparator, an alternating voltage being fed as desired value to the second input terminal of the comparator; and wherein an output terminal of the comparator is connected to the control element, an output state of said comparator varies in accordance with amplitude of said alternating voltage to induce repetitive periods of excitation of said primary winding by said first transistor, said first resistor acting to discharge said second capacitor between periods of excitation of said primary winding, a discharge of said capacitor activating said second transistor to reduce voltage across the load, thereby to provide alternating states of voltage to the load.

2. A circuit for producing an alternating voltage in an electronic device which is connected to a d.c. voltage via a remote feed, said circuit being located within the device and comprising:

an electronic system, and a current supply which produces a voltage for operating the electronic system and for supplying a current for at least one load external to the device;

a clock producing pulses, a transformer having a primary winding and a secondary winding, a first transistor having a control electrode and being located within a current path of the primary winding, and a control element connected to the control electrode of the transistor, the pulses of the clock being fed via the control element to the control electrode of the first transistor, current of said secondary winding being divided among a first current path and a second current path;

a first diode and a first capacitor disposed in said first current path of said secondary winding, and a second diode and a second capacitor disposed in said second current path of said secondary winding, an output terminal of said secondary winding being connected via said first and said second diodes respectively to said first and said second capacitors;

a second transistor having a control electrode connected to said second capacitor, a first resistor connected in parallel to said second capacitor, and wherein the load includes capacitive and resistive elements serially connected between terminals of the load, the load being connected in parallel with said first capacitor and being connected via a current path to said second transistor for discharge of said capacitive element;

feedback means;

a comparator having a first input terminal and a second input terminal, a second resistor and a third resistor serially connected via a junction point to form a voltage divider; and wherein said voltage divider is connected in parallel to the first capacitor the junction point of the voltage divider being connected to the first input terminal of the comparator, an alternating voltage being fed as desired value to the second input terminal of the comparator; and wherein an output terminal of the comparator is connected to the control element;

a discharge current flowing through the second transistor is fed back via the feedback means to the current supply.

3. The circuit according to claim 1, wherein the first transistor (T1) is a field effect transistor, preferably a MOSFET.

4. The circuit according to claim 2, wherein the first transistor (T1) is a field effect transistor, preferably a MOSFET.

5. The circuit according to claim 1, wherein said first transistor is a bipolar transistor.

6. The circuit according to claim 2, wherein said first transistor is a bipolar transistor.

7. The circuit according to claim 1, wherein the second transistor is a field effect transistor.

8. The circuit according to claim 7, wherein said field effect transistor is a MOSFET.

9. The circuit according to claim 1, wherein the second transistor is replaced by a Darlington circuit.

* * * * *